(No Model.) 2 Sheets—Sheet 1.
G. PRESCOTT.
METHOD OF GRINDING SPECTACLE LENSES.
No. 512,485. Patented Jan. 9, 1894.
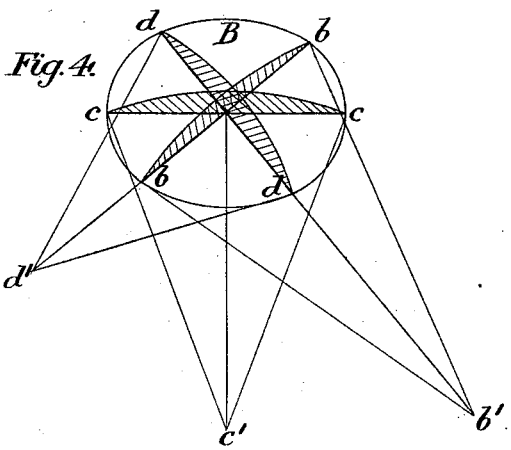
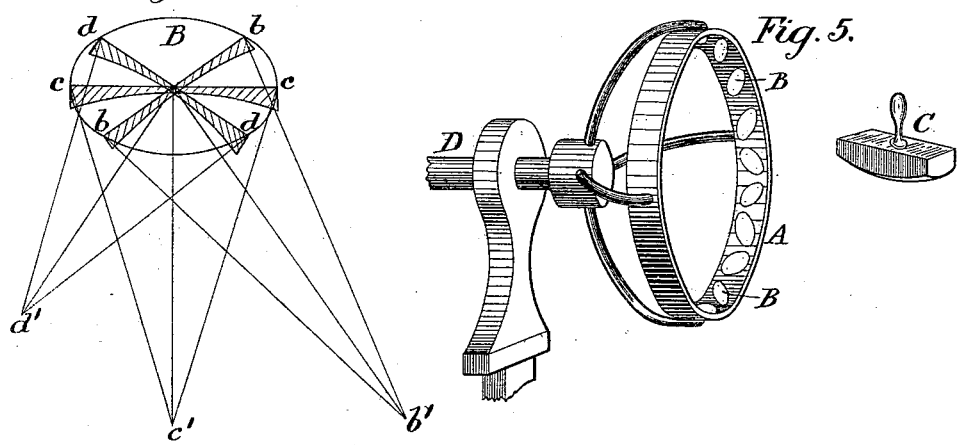
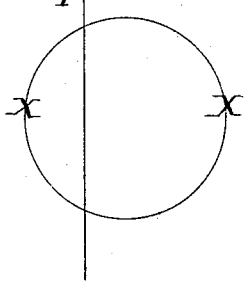
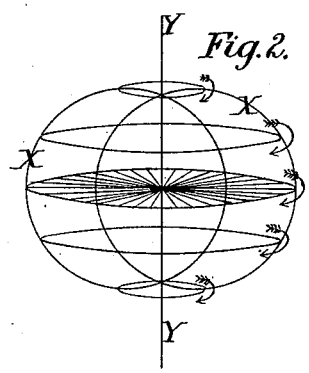
Witnesses:
S. M. Lovett,
I. G. Cameron,
Inventor:
George Prescott,
By F. C. Somes
Attorney.

(No Model.) 2 Sheets—Sheet 2.
G. PRESCOTT.
METHOD OF GRINDING SPECTACLE LENSES.
No. 512,485. Patented Jan. 9, 1894.
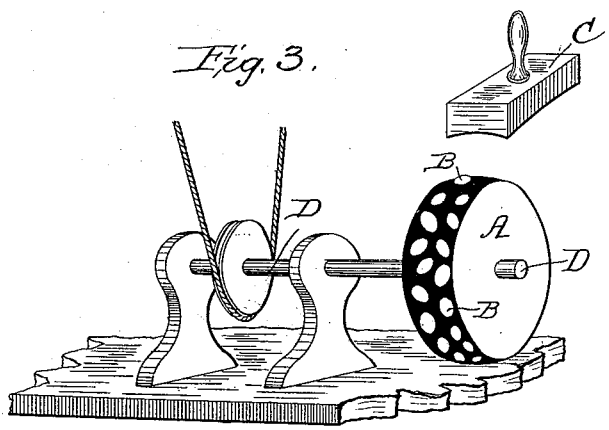
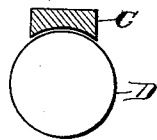

UNITED STATES PATENT OFFICE.

GEORGE PRESCOTT, OF DUBLIN, IRELAND.

METHOD OF GRINDING SPECTACLE-LENSES.

SPECIFICATION forming part of Letters Patent No. 512,485, dated January 9, 1894.

Application filed September 1, 1891. Serial No. 404,444. (No specimens.) Patented in England December 3, 1890, No. 19,683.

*To all whom it may concern:*

Be it known that I, GEORGE PRESCOTT, a subject of the Queen of Great Britain, residing at Dublin, in the county of Dublin, Ireland, have invented a certain new and useful Method of Grinding Spectacle-Lenses, (for which I have obtained a patent in Great Britain, No. 19,683, bearing date December 3, 1890,) of which the following is a specification.

Astigmatic vision has hitherto been reduced by the use of lenses with a cylindric surface; such method is open to the objection that only the principal meridians are treated correctly, the intermediate surfaces not being appreciably dealt with, and although lenses with shortest radius of curvature in the shortest diameter have been ground, such lenses offer a correction for a maximum error in one meridian only, so far as the cylindric effect is concerned, and that meridian one of least frequency.

I have devised a simple apparatus for grinding lenses having the same character of surface as that which occurs on an astigmatic cornea. Such a lens would be generally described by an optician as an elliptic lens, because a section through the lens at right angles to its axis would show a peripheral elliptic curve. My lens presents a surface of revolution, to wit, an eccentric circle of revolution.

In the accompanying drawings Figures 1 and 2 are diagrams showing what is meant by an eccentric circle of revolution. Fig. 3 is a perspective view of a suitable form of lathe and tool for producing my lenses. Fig. 4 is a view of one of the lenses produced by the apparatus illustrated in Fig. 3, and showing sections of such lens in three different meridians. Fig. 5 is a perspective view of a suitable form of apparatus and tool for producing lenses according to my invention so as to give them a minus refraction, and Fig. 6 is a view of one of the lenses produced by the apparatus illustrated in Fig. 5, and showing sections of such lens in three different meridians.

Referring to Figs. 1 and 2, it will be seen that if the circle X is caused to revolve around the axis Y (Fig. 1) it will describe the figure indicated in Fig. 2, *i. e.*, an eccentric circle of revolution. The middle section of such figure is in Fig. 2 drawn with radii of the circle at this point. As above stated the lenses produced according to my invention present such eccentric circle of revolution, and in order to produce this I proceed as follows:

Referring to Fig. 3, on the grinding lathe is fixed a disk chuck A of a radius which is that intended for the curvature of the surface of the lenses in one meridian, and of such thickness as will permit the desired number of pieces of glass B to be cemented side by side around the edge of the chuck. For instance, if a number of lenses are to be ground on the chuck A and the lenses are to be each one inch in diameter and are to be cemented in two rows around the chuck, then the chuck may be two inches thick. A cylindric grinding tool C, which is curved to the radius of the chuck and has also a curvature in the plane at right angles to the ordinary curve, is now applied, with the usual media, to the pieces of glass cemented on the chuck A.

The axis D of the lathe on which the chuck A revolves is eccentric to the axis of the curve of the cylindric tool C when the latter is applied thereto, so that as the glasses B are ground to the curvature of such tool, and to the radius of the chuck, they will present an eccentric circle of revolution. The chuck A is rotated. The glasses B are (by their more or less rapid rotation, the application of the grinding tool C with cylindric surface, and the emery and other usual media) ground and polished, and when finished the lenses have a shorter radius of curvature in one meridian, viz., that of the cylindrical surface tool C, or that of the chuck A, whichever is shorter, and a longer radius of curvature in the other principal meridian, together with a graduation of surface in the intermediate spaces similar to that which occurs on the human astigmatic cornea.

From the above description it will be clear that it is within the power of the operator to cement the pieces of glass on the chuck, so that their longer or shorter diameter (assuming the glasses to be of oval form) occupies any desired position in relation to the path of rotation of such chuck, thus enabling the shorter or longer radius of curvature of the lens to be produced in any desired meridian relatively to the longer or shorter diameter, and by a simple and inexpensive process. For this purpose it is only necessary to fix the glasses B on the chuck A so that the longer or shorter diameter thereof lies either parallel with or at any desired angle to the axis of the chuck. This will be understood by reference to Figs. 3 and 5, in which the different glasses B are arranged with their longer and shorter diameters at different angles on the chuck.

Fig. 4 shows a lens B ground on the lathe illustrated in Fig. 3 the sections $b$, $c$ and $d$ being taken at three different diameters in different meridians, section $b$ having a curvature of three inches radius, and the lines $b'$ being the radii of curvature; $c$ having a curvature of two and one half inches radius, and $c'$ being the radii of curvature; and $d$ having a curvature of two inches, and $d'$ being the radii of curvature.

Glasses intended to have a minus refraction may be cemented on the inside of a "bell" chuck, and then treated as above described. Fig. 5 shows a lathe suitable for producing this form of lens, the glasses B being secured on the inside of the bell chuck A, and the cylindric grinding tool C, applied thereto.

A lens having a minus refraction is shown in Fig. 6, where B is the lens, and $b$, $c$ and $d$ sections of the same in three different meridians, while $b'$, $c'$ and $d'$ are the radii of curvature of the respective sections.

What I claim as my invention, and desire to secure by Letters Patent, is—

The method of grinding a lens for correction of astigmatic vision, which consists in mounting a lens blank upon a rotary chuck of a radius adapted to produce the curvature of the desired lens in one meridian, the longer diameter of said blank being disposed at an angle to the axis of the chuck, then applying to said blank during rotation of the chuck a tool having the curvature to be given to the lens in the other meridian, the necessary grinding media being interposed, substantially as set forth.

GEORGE PRESCOTT.

Witnesses:
GEORGE PRESCOTT, Jr.,
F. ROBERTS.